US012612533B2

(12) United States Patent      (10) Patent No.:   US 12,612,533 B2
Gupta et al.      (45) Date of Patent:    Apr. 28, 2026

(54) ELECTROCOATING COMPOSITION

(71) Applicant: AXALTA COATING SYSTEMS IP CO., LLC, Wilmington, DE (US)

(72) Inventors: Harshit Gupta, Philadelphia, PA (US); Arun Surendranath, Philadelphia, PA (US); Hanxiang Zeng, Philadelphia, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 18/615,570

(22) Filed: Mar. 25, 2024

(65) Prior Publication Data

US 2024/0263037 A1     Aug. 8, 2024

Related U.S. Application Data

(62) Division of application No. 17/184,149, filed on Feb. 24, 2021, now abandoned.

(60) Provisional application No. 62/982,501, filed on Feb. 27, 2020.

(51) Int. Cl.
    *C09D 163/00*      (2006.01)
    *C25D 13/04*      (2006.01)
    *C25D 13/22*      (2006.01)

(52) U.S. Cl.
    CPC ........... *C09D 163/00* (2013.01); *C25D 13/04* (2013.01); *C25D 13/22* (2013.01)

(58) Field of Classification Search
    None
    See application file for complete search history.

(56) References Cited

U.S. PATENT DOCUMENTS

| | | | | |
|---|---|---|---|---|
| 4,031,050 A | * | 6/1977 | Jerabek | ................ C09D 5/4419 |
| | | | | 524/901 |
| 5,070,149 A | | 12/1991 | DeBroy et al. | |
| 5,096,556 A | * | 3/1992 | Corrigan | .............. C09D 5/4492 |
| | | | | 523/403 |
| 5,407,976 A | | 4/1995 | Uhlianuk | |
| 5,430,078 A | * | 7/1995 | Hoppe-Hoeffler | ... C09D 5/4492 |
| | | | | 524/901 |
| 2008/0308423 A1 | | 12/2008 | Slater | |

FOREIGN PATENT DOCUMENTS

| | | |
|---|---|---|
| CN | 1944545 A | 4/2007 |
| CN | 102016131 A | 4/2011 |
| CN | 109312188 A | 2/2019 |

OTHER PUBLICATIONS

Cellusize QP5200H Technical Data Sheet (Year: 2021).*
Li Fang, et al, (Discussion about the Development and Application of Cationic Microgel in Electrophoresis Coatings' Edge Coverings) Jul. 31, 2018, vol. No. 33.
Bai Yun, et al, (Application of High Edge Anti-corrosive Electrophoretic Paint) Jul. 31, 2017, vol. No. 46.
EPO, European Extended Search Report issued in EP App. No. 21159156.5, dated Jul. 16, 2021.

* cited by examiner

*Primary Examiner* — Louis J Rufo
(74) *Attorney, Agent, or Firm* — Ingrassia Fisher & Lorenz, LLP

(57) ABSTRACT

Cathodic electrocoating composition with improved edge protection and coating appearance are provided. An exemplary cathodic electrocoating composition includes an aqueous carrier, a film forming binder dispersed in the carrier and including an epoxy-amine adduct and a blocked polyisocyanate crosslinking agent; a pigment paste; a water-soluble cellulose ether; and a cationic microgel dispersion which is prepared by a process comprising dispersing in aqueous medium a mixture of a cationic polyepoxide-amine reaction product which contains amine groups selected from the group consisting of primary amine groups, secondary amine groups, and mixtures thereof and a polyepoxide crosslinking agent and heating the mixture to a temperature sufficient to crosslink the mixture to form the cationic microgel dispersion. The water-soluble cellulose ether may be hydroxyethyl cellulose.

20 Claims, No Drawings

ELECTROCOATING COMPOSITION

CROSS-REFERENCE TO RELATED APPLICATIONS

This application is a divisional of U.S. application Ser. No. 17/184,149, filed on Feb. 24, 2021, which claims the benefit of U.S. Provisional Application No. 62/982,501, filed Feb. 27, 2020, the disclosures of which are incorporated herein by reference in their entireties.

TECHNICAL FIELD

The technical field generally relates to electrocoating compositions for coating substrates, and more particularly relates to electrocoating compositions that provide improved edge protection and good coating appearance.

BACKGROUND

The coating of electrically conductive substrates by an electrodeposition process also called an electrocoating process is a well-known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion, which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

The lack of edge protection or edge coverage of the composition has been a continuing problem with cathodic electrocoating compositions. There have been various additives proposed in the art to address this problem. However, there remains a desire for electrocoating compositions that have improved coverage at the edges of the coated substrate and which do not impart a negative impact on properties of the electrocoating layer, subsequent coating layers applied thereto, or both.

SUMMARY

Cathodic electrocoating composition with improved edge protection and coating appearance are provided. An exemplary cathodic electrocoating composition includes an aqueous carrier, a film forming binder dispersed in the carrier and including an epoxy-amine adduct and a blocked polyisocyanate crosslinking agent; a pigment paste; a water-soluble cellulose ether; and a cationic microgel dispersion which is prepared by a process comprising dispersing in aqueous medium a mixture of a cationic polyepoxide-amine reaction product which contains amine groups selected from the group consisting of primary amine groups, secondary amine groups, and mixtures thereof and a polyepoxide crosslinking agent and heating the mixture to a temperature sufficient to crosslink the mixture to form the cationic microgel dispersion. The water-soluble cellulose ether may be hydroxyethyl cellulose.

In another embodiment, a method for coating an electrically conductive substrate is provided. The method includes dipping the electrically conductive substrate into an electrodeposition bath comprising the cathodic electrocoating composition as described herein. Further, the method includes connecting the substrate as a cathode and applying a current to the substrate to deposit a film on the substrate. Also, the method includes removing the substrate with the deposited film from the electrodeposition bath and baking the deposited coating film.

Another exemplary embodiment provides a method for preparing a cathodic electrocoating composition. The method includes dispersing in aqueous medium a mixture of a cationic polyepoxide-amine reaction product which contains amine groups selected from the group consisting of primary amine groups, secondary amine groups, and mixtures thereof and a polyepoxide crosslinking agent to form a mixture and heating the mixture to a temperature sufficient to crosslink the mixture to form a cationic microgel dispersion. The method further includes preparing an epoxy amine adduct of an epoxy resin; preparing a crosslinking agent for the epoxy amine adduct; blending the epoxy amine adduct with the crosslinking agent to form a film forming binder; forming an emulsion from the film forming binder and an aqueous carrier; combining the cationic microgel dispersion and a water-soluble cellulose ether with the emulsion; and forming a pigment paste and blending the pigment paste with the emulsion to form an electrocoating bath.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description is merely exemplary in nature and is not intended to limit the electrocoating compositions and methods for forming electrocoating compositions as described herein. Furthermore, there is no intention to be bound by any theory presented in the preceding background or summary or in the following detailed description.

As used herein, "a," "an," or "the" means one or more unless otherwise specified. The term "or" can be conjunctive or disjunctive. Open terms such as "include," "including," "contain," "containing" and the like mean "comprising." In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is +10%. All numbers in this description indicating amounts, ratios of materials, physical properties of materials, and/or use may be understood as modified by the word "about," except as otherwise explicitly indicated. As used herein, the "%" or "percent" described in the present disclosure refers to the weight percentage unless otherwise indicated.

An electrocoating composition for coating a substrate is provided herein. The electrocoating composition may be utilized to coat any type of substrate known in the art. In embodiments, the substrate is a vehicle, automobile, or automobile vehicle. "Vehicle" or "automobile" or "automobile vehicle" includes an automobile, such as, car, van, minivan, bus, SUV (sports utility vehicle); truck; semi-truck; tractor; motorcycle; trailer; ATV (all-terrain vehicle); pickup truck; heavy duty mover, such as, bulldozer, mobile crane and earth mover; airplanes; boats; ships; and other modes of transport.

The electrocoating composition is utilized to form a coating layer on the substrate. Exemplary embodiments herein provide a full electrocoating bath to form a coating layer on a substrate. Certain embodiments utilize epoxy amine based resins or binders that are neutralized with acids to form emulsions.

The film thickness of electrocoating highly depends upon current densities on the substrate. Though sharp edges exhibit the highest current densities and, therefore, have a higher amount of coating deposited than at bulk areas, pull-away during the bake exposes the metal at the edges. This exposure of uncoated metal affects the corrosion performance of edges, which becomes the major source of corrosion for an electrocoated surface. Methods to improve edge protection or edge coverage can deteriorate coating appearance or can affect other secondary properties, i.e., throw power.

However, herein is described a composition and method for improving edge protection while maintaining coating appearance.

It has been found that the combined use of a water-soluble cellulose ether and the cationic microgel dispersion described herein within an electrocoating composition provides a synergistic benefit.

Provided herein is an electrocoating composition, such as a bath, with improved edge protection and good coating appearance that includes an aqueous carrier, a film forming binder dispersed in the carrier, wherein the binder comprises an epoxy-amine adduct and a blocked polyisocyanate cross-linking agent, a pigment paste, a water-soluble cellulose ether, and a cationic microgel dispersion which is prepared by a process comprising dispersing in aqueous medium a mixture of a cationic polyepoxide-amine reaction product which contains amine groups selected from the group consisting of primary amine groups, secondary amine groups, and mixtures thereof and a polyepoxide crosslinking agent and heating the mixture to a temperature sufficient to cross-link the mixture to form the cationic microgel dispersion.

Water-Soluble Cellulose Ether

Water-soluble cellulose ether materials are well-known in the art. For example, U.S. Pat. No. 5,430,078 discloses water-soluble cellulose ethers and is incorporated by reference. During processing, water solubility is imparted to the cellulose by the incorporation of water-solubilizing groups such as hydroxyl or carboxyl groups. Commercially-available water-soluble cellulose ethers include, for example, hydroxyethyl cellulose (HEC), carboxymethyl cellulose, carboxymethylhydroxyethyl cellulose, hydroxymethyl cellulose, and carboxyethyl cellulose. In an exemplary embodiment, the water-soluble cellulose ether is hydroxyethyl cellulose.

Water-soluble cellulose ethers such as hydroxyethyl cellulose may be provided in varying molecular weights. In an exemplary embodiment, the water-soluble cellulose ether has a molecular weight of from 250,000 to 1,500,000 Da (weight average molecular weight). For example, the water-soluble cellulose ether may have a molecular weight of from 350,000 to 1,200,000 Da (weight average molecular weight).

The water-soluble cellulose ether is incorporated into the electrocoating composition. The water-soluble cellulose ether may be useful in the electrocoating composition at levels of from 0.001 to 10, such as from 0.01 to 2, percent by weight, the percentage by weight being based on weight of resin solids of the composition. In an exemplary embodiment, the hydroxyethyl cellulose is present in the composition in amounts of from 0.05 to 0.8, such as from 0.05 to 0.15, percent by weight, based on weight of resin solids of the composition. In another exemplary embodiment, the hydroxyethyl cellulose is present in the composition in amounts of from 0.075 to 0.15 percent by weight, based on weight of resin solids of the composition. In another exemplary embodiment, the hydroxyethyl cellulose is present in the composition in amounts of from 0.02 to 0.2 percent by weight, based on weight of resin solids of the composition. For example, the hydroxyethyl cellulose may be present in the composition in an amount of 0.1 percent by weight, based on weight of resin solids of the composition.

In certain embodiments, the water-soluble cellulose ether is present in the composition in amounts of at least 0.01, such as at least 0.02, for example at least 0.03, such as at least 0.04, for example at least 0.05, such as at least 0.06, for example at least 0.07, such as at least 0.08, for example at least 0.09, such as at least 0.1, percent by weight, based on weight of resin solids of the composition.

In certain embodiments, the water-soluble cellulose ether is present in the composition in amounts of at most 8, such as at most 1, for example at most 0.9, such as at most 0.8, for example at most 0.7, such as at most 0.6, for example at most 0.5, such as at most 0.4, for example at most 0.3, such as at most 0.2, for example at most 0.1, percent by weight, based on weight of resin solids of the composition.

Cationic Microgel Dispersion

A cationic microgel dispersion can be prepared by first dispersing in aqueous medium a reactive mixture of a cationic polyepoxide-amine reaction product and a polyepoxide crosslinking agent. The dispersion step can be accomplished by adding the polyepoxide-amine reaction product, such as at elevated temperatures of from 100° to 150° C. to a mixture of water and acid to form a cationic dispersion of the resin in water. Typically, the solids content of the resulting dispersion will be 20 to 50 percent by weight and the degree of neutralization will be from 20 to 100 percent of the total theoretical neutralization. The acid can be an organic acid such as formic acid, lactic acid and acetic acid as well as inorganic acid such as phosphoric acid and sulfamic acid. Also, blends of acids including blends of organic and inorganic acids can be used. The extent of neutralization depends upon the particular reaction product and usually only sufficient acid is added to stabilize the resulting microgel dispersion. The expression "cationic polyepoxide-amine reaction product which contains primary and/or secondary amine groups" includes primary and secondary amine groups and the acid salts thereof.

The polyepoxide crosslinking agent usually dissolved in water-immiscible co-solvent such as methyl isobutyl ketone is then slowly stirred into the cationic polyepoxide-amine dispersion. This step is usually accomplished at ambient temperature and additional water may optionally be added. Typically, the solids content of the mixture will be 10 to 40 percent by weight. Although the mixture may be reactive at room temperature, the dispersion is usually heated with continued stirring such that the final degree of crosslinking will be accomplished in a reasonable period of time. Typically, the dispersion is heated to 40° to 90° C for 1 to 6 hours. During the heating step, the resultant dispersion begins to thicken and typically over this temperature range and time, the crosslinking action will be essentially complete.

The resin solids content of the cationic microgel dispersion is typically from 5 to 40 percent by weight. The dispersions at this solids content have good storage stability. The particle size of the cationic microgel dispersion is typically from 500 to 2,000 Angstroms with the particle size being determined by light scattering techniques.

The cationic microgels can be recovered from the aqueous dispersions as dried products by solvent evaporation, spray drying or the like. The dried product can then be re-dispersed or used as such, for example, as a flow control additive in powder coatings.

Components and process conditions used in forming the cationic microgel dispersion are disclosed in U.S. Pat. No. 5,096,556, which is hereby incorporated by reference.

The cationic microgel dispersion is incorporated into the electrocoating composition. In exemplary embodiments, the cationic microgel dispersion is present in the composition in amounts of from 0.5 to 8 percent by weight, based on weight of resin solids of the composition. In other exemplary embodiments, the cationic microgel dispersion is present in the composition in amounts of from 1 to 3, such as from 1.5 to 2.5, percent by weight, based on weight of resin solids of the composition. For example, the cationic microgel dispersion may be present in the composition in an amount of 2 percent by weight, based on weight of resin solids of the composition.

In certain embodiments, the cationic microgel dispersion is present in the composition in amounts of at least 0.25, such as at least 0.5, for example at least 0.75, such as at least 1, for example at least 1.25, such as at least 1.5, for example at least 1.75, such as at least 2, percent by weight, based on weight of resin solids of the composition.

In certain embodiments, the cationic microgel dispersion is present in the composition in amounts of at most 8, such as at most 7.5, for example at most 7, such as at most 6.5, for example at most 6, such as at most 5.5, for example at most 5, such as at most 4.5, for example at most 4, such as at most 3.5, for example at most 3, such as at most 4.5, for example at most 4, such as at most 3.5, for example at most 3, such as at most 2.5, for example at most 2, percent by weight, based on weight of resin solids of the composition.

Backbone Emulsion

Most of the solids in the electrocoated film come from the backbone resin in the electrocoating bath. Common cathodic electrocoating backbone emulsions include an acid-neutralized water-soluble binder of an epoxy amine adduct blended with a crosslinking agent. Exemplary binders and crosslinking agents are disclosed in U.S. Pat. No. 4,419,467, which is hereby incorporated by reference. Typical crosslinking agents are based on blocked isocyanates which are prepared by reacting isocyanates such as hexamethylene diisocyanate, cyclohexamethylene diisocyanate, toluene diisocyanate, methylene diphenyl diisocyanate, or other suitable isocyanates, with blocking agents like oximes, alcohols, or caprolactams, which block the reactive isocyanate functionality. These blocking agents separate only during baking and provide a reactive isocyanate group which can react with hydroxy or amine group and form crosslink networks.

Additives

Further additives such as catalysts, anti-crater additives, etc., can be added to the emulsion to achieve desired properties.

Pigment Paste

Another major source of solids in electrocoated films come from pigments that are incorporated in the electrocoating composition in the form of a paste. Pigment paste may be prepared by de-agglomerating pigment particles and dispersing them in a grinding vehicle. An exemplary grinding vehicle includes a resin (grinding resin), water and additives like wetting agents, surfactants, catalyst and defoamers. Any suitable known pigment grinding vehicle may be used. After grinding, the particle size of the pigment should be as small as practical; generally, the particle size is from 6 to 8 using a Hegman grinding gauge.

Exemplary pigments for use in the electrocoating composition include titanium dioxide, barium sulfate, carbon black, hydrated aluminum silicate, basic lead silicate, strontium chromate, iron oxide, clay and the like. In certain embodiments, the pigment paste may include an anti-corrosive pigment or blends of anticorrosive pigments. Exemplary anti-corrosive pigments include metallic chromates, phosphates, phosphites, borates, borosilicates, phosphosilicates, molybdates, oxides, and rare earth compounds. Organic anticorrosive agents may optionally also be present; they include benzotriazoles, morpholines, azoles, calcium alkyl-aryl sulfonates, diamines, and metal salts of dinonylnapathalene sulfonates.

An exemplary pigment may have a pigment to binder weight ratio of from 2:1 to 6:1. An exemplary pigment paste may contain from 40 to 65, such as 45 to 65, percent by weight solids. General cathodic electrocoating pigment pastes can be used, such as those disclosed in U.S. Pat. No. 6,207,731.

After formation of an exemplary electrocoating composition, the cathodic electrocoating composition has a pigment to binder weight ratio of less than 0.5:1, such as less than 0.4:1, for example from 0.1:1 to 0.4:1, such as from 0.15:1 to 0.4:1. The pigment to binder weight ratio may be an important parameter. Generally, higher pigment to binder weight ratios in the composition can affect the flow of the composition and therefore, appearance.

EXAMPLES

In each of Examples 1-5, an electrocoating composition was formed using 1640 g of backbone emulsion (40% solids), 2040 g of deionized water, and 320 g of pigment paste (50% solids). For Example 1, no further components were added. For Examples 2-5, a solution of 1% Cellosize 15000H (HEC) was prepared in water, and different amounts of the HEC solution were added to the backbone emulsion. Specifically, the final composition was formed with 0.3% HEC solids based on resin solids in Example 2; the final composition was formed with 0.15% HEC solids based on resin solids in Example 3; the final composition was formed with 0.1% HEC solids based on resin solids in Example 4; and the final composition was formed with 0.1% HEC solids based on resin solids in Example 5. Further, in Example 5, the cationic microgel dispersion was also added to the emulsion such that the final composition was formed with 2% cationic microgel dispersion solids based on resin solids.

which the binder is in the dispersed phase and water the continuous phase. The average particle size diameter of the binder phase may be 0.1 to 10 microns, such as less than 5 microns. The concentration of the binder in the aqueous

TABLE 1

| Electrocoating composition components | Example 1 | Example 2 | Example 3 | Example 4 | Example 5 |
|---|---|---|---|---|---|
| Backbone emulsion (40% solids) | 1640 gm | 1640 gm | 1640 gm | 1640 gm | 1640 gm |
| DI Water | 2040 gm | 2040 gm | 2040 gm | 2040 gm | 2040 gm |
| Pigment Paste (50% solids) | 320 gm | 320 gm | 320 gm | 320 gm | 320 gm |
| Water-soluble Cellulose Ether | 0 | 0.3% HEC solids based on resin solids | 0.15% HEC solids based on resin solids | 0.1% HEC solids based on resin solids | 0.1% HEC solids based on resin solids |
| Cationic Microgel Dispersion | 0 | 0 | 0 | 0 | 2% solids based on resin solids |
| Properties | | | | | |
| Bath Solid (%) | 20% | 20% | 20% | 20% | 20% |
| Bath P/B (%) | 18% | 18% | 18% | 18% | 18% |
| pH | 6.08 | — | 6.41 | 6.86 | 6.85 |
| Conductivity | 1945 | — | 2298 | 2075 | 2017 |
| Ra on 6800 OG (μm) | 0.25 | 0.45 | 0.35 | 0.34 | 0.41 |
| Edge protection performance * | 4.3 | 2 | 1.9 | 3.3 | 1.7 |
| Throw power | 60% | 0% | 39% | 40% | 43% |

* 0—best rating; 5—worst rating

The edge protection performance was characterized via EIS (Electrochemical Impedance Spectroscopy), the coating appearance was evaluated by surface roughness (Ra), and the throw power was tested by Nagoya box setup.

As can be seen, the coating appearances (Ra) of Example 5 (including the combination of water-soluble cellulose ether and the cationic microgel dispersion, are in the same range as the Comparative Examples 1-4 which do not include the combination. Example 5 showed optimized performance by balancing edge protection, coating appearance (surface roughness), and throw power.

Combination of Water-Soluble Cellulose Ether and Cationic Microgel Dispersion

The synergistic effect found by combining the water-soluble cellulose ether and the cationic microgel dispersion may be optimized at certain ratios. For example, the composition may be formed with a cationic microgel dispersion weight solids to water-soluble cellulose ether (e.g., hydroxyethyl cellulose) weight solids ratio of from 10:1 to 55:1, such as from 15:1 to 25:1.

In certain embodiments, the cationic microgel dispersion weight solids to water-soluble cellulose ether weight solids ratio is at least 5:1, such as at least 8:1, for example at least 10:1, such as at least 12:1, for example at least 15:1, such as at least 20:1. In certain embodiments, the cationic microgel dispersion weight solids to water-soluble cellulose ether weight solids ratio is at most 80:1, such as at most 60:1, for example at most 55:1, such as at most 40:1, for example at most 35:1, such as at most 30:1; for example at most 25:1, such as at most 20:1.

The electrocoating composition may be described herein as an aqueous dispersion. The term "dispersion" as used within the context herein is believed to be a two-phase translucent or opaque aqueous resinous binder system in medium in general is not critical, but ordinarily the major portion of the aqueous dispersion is water. The aqueous dispersion usually contains from 3 to 50 percent, such as 5 to 40 percent by weight binder solids. Aqueous binder concentrates which are to be further diluted with water when added to an electrocoating bath, generally have a range of binder solids of 10 to 30 percent weight.

As compared to conventional aqueous cathodic electrocoating compositions, a cathodic electrocoating composition formed with the above-described combination of the water-soluble cellulose ether and the cationic microgel dispersion exhibited improved edge protection and good coating appearance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A cathodic electrocoating composition comprising:
an aqueous carrier;
a film forming binder dispersed in the carrier, wherein the binder comprises an epoxy-amine adduct and a blocked polyisocyanate crosslinking agent;
a pigment paste;

hydroxyethyl cellulose having a weight average molecular weight of from about 250,000 to about 1,500,000 Da in an amount of from about 0.08 to about 0.12 percent by weight, based on weight of resin solids of the composition; and a cationic microgel dispersion having a particle size of from about 500 to about 2000 Angstroms and present in an amount of from about 1.8 to about 2.2 percent by weight, based on weight of resin solids of the composition, which is prepared by a process comprising dispersing in aqueous medium a mixture of a cationic polyepoxide-amine reaction product which contains amine groups selected from the group consisting of primary amine groups, secondary amine groups, and mixtures thereof and a polyepoxide crosslinking agent and heating the mixture to a temperature sufficient to crosslink the mixture to form the cationic microgel dispersion; wherein the composition has a cationic microgel dispersion weight solids to hydroxyethyl cellulose weight solids ratio of from about 18:1 to about 22:1; and wherein the cathodic electrocoating composition has a pigment to binder weight ratio of from about 0.15:1 to about 0.25:1.

2. The composition of claim 1 wherein the pigment paste contains from about 45 to about 65 percent by weight solids.

3. The composition of claim 1 wherein the cationic microgel dispersion has a resin solids content of from about 5 to about 40 percent by weight.

4. The composition of claim 1 wherein the composition is configured to provide an electrodeposition bath with a pH of from about 6 to about 7, a conductivity of from about 1900 to about 2300 microsiemens/cm, and a solids content of from about 18 to about 22 percent by weight.

5. The composition of claim 1 wherein the pigment paste comprises at least one anti-corrosive pigment selected from the group consisting of metallic chromates, phosphates, phosphites, borates, borosilicates, phosphosilicates, molybdates, oxides, and rare earth compounds.

6. The composition of claim 1 wherein the composition is configured to, when applied to an electrically conductive substrate by cathodic electrodeposition, form a cured coating with a surface roughness of from about 0.35 to about 0.45 micrometers and an edge protection rating of from about 1.5 to about 2.0 as measured by electrochemical impedance spectroscopy.

7. The composition of claim 1 wherein the hydroxyethyl cellulose has a weight average molecular weight of from 350,000 to 1,200,000 Da.

8. The composition of claim 7 wherein the hydroxyethyl cellulose is present in an amount of about 0.1 percent by weight, based on weight of resin solids of the composition, and the cationic microgel dispersion is present in an amount of about 2 percent by weight, based on weight of resin solids of the composition.

9. The composition of claim 8 wherein the composition has a cationic microgel dispersion weight solids to hydroxyethyl cellulose weight solids ratio of about 20:1.

10. The composition of claim 9 wherein the pigment paste comprises at least one anti-corrosive pigment selected from the group consisting of metallic chromates, phosphates, phosphites, borates, borosilicates, phosphosilicates, molybdates, oxides, and rare earth compounds.

11. The composition of claim 10 wherein the pigment paste contains from about 45 to about 65 percent by weight solids and wherein the pigment in the pigment paste has a pigment to binder weight ratio of from about 2:1 to about 6:1.

12. The composition of claim 10 wherein the cathodic electrocoating composition has a pigment to binder weight ratio of about 0.18:1.

13. The composition of claim 10 wherein the composition is configured to provide an electrodeposition bath with a pH of from about 6.0 to about 7.0; a conductivity of from about 1900 to about 2300 microsiemens/cm; and a solids content of from about 18 to about 22 percent by weight.

14. A cathodic electrocoating composition comprising:

an aqueous carrier;

a film forming binder dispersed in the carrier, wherein the binder comprises an epoxy-amine adduct and a blocked polyisocyanate crosslinking agent;

a pigment paste;

hydroxyethyl cellulose having a weight average molecular weight of from about 250,000 to about 1,500,000 Da in an amount of from about 0.075 to about 0.15 percent by weight, based on weight of resin solids of the composition; and a cationic microgel dispersion having a particle size of from about 500 to about 2000 Angstroms and present in an amount of from about 1.5 to about 2.5 percent by weight, based on weight of resin solids of the composition, the cationic microgel dispersion prepared by dispersing in aqueous medium a mixture of a cationic polyepoxide-amine reaction product containing primary amine groups, secondary amine groups, or mixtures thereof and a polyepoxide crosslinking agent, and heating the mixture to a temperature sufficient to crosslink the mixture to form the cationic microgel dispersion; wherein the composition has a cationic microgel dispersion weight solids to hydroxyethyl cellulose weight solids ratio of from about 15:1 to about 25:1 wherein the cathodic electrocoating composition has a pigment to binder weight ratio of from about 0.15:1 to about 0.25:1; and wherein the composition provides a synergistic improvement in edge protection and coating appearance with a surface roughness of from about 0.35 to about 0.45 micrometers.

15. The composition of claim 14, wherein the composition is configured to provide an electrodeposition bath with a pH of from about 6 to about 7 and a conductivity of from about 1900 to about 2300 microsiemens/cm.

16. The composition of claim 14 wherein the hydroxyethyl cellulose has a weight average molecular weight of from about 350,000 to about 1,200,000 Da.

17. The composition of claim 14 wherein the hydroxyethyl cellulose is present in an amount of about 0.1 percent by weight, based on weight of resin solids of the composition, and the cationic microgel dispersion is present in an amount of about 2 percent by weight, based on weight of resin solids of the composition.

18. The composition of claim 14 wherein the composition has a cationic microgel dispersion weight solids to hydroxyethyl cellulose weight solids ratio of about 20:1.

19. The composition of claim 14 wherein the cationic microgel dispersion has a particle size of from about 700 to about 1500 Angstroms.

20. The composition of claim 14 wherein the cathodic electrocoating composition has a pigment to binder weight ratio of about 0.18:1.

\* \* \* \* \*